United States Patent [19]
Roberts

[11] Patent Number: 5,482,251
[45] Date of Patent: Jan. 9, 1996

[54] STEM EXTENSION FOR QUARTER-TURN VALVES

[75] Inventor: John L. Roberts, Greenfield, Wis.

[73] Assignee: Milwaukee Valve Company, Inc., Milwaukee, Wis.

[21] Appl. No.: 288,684

[22] Filed: Aug. 11, 1994

[51] Int. Cl.⁶ .......................... F16K 31/46; F16K 51/00
[52] U.S. Cl. ........................................ 251/288; 251/293
[58] Field of Search .................................. 251/288, 291, 251/292, 293

[56] References Cited

U.S. PATENT DOCUMENTS

| | | | |
|---|---|---|---|
| 2,198,455 | 4/1940 | Mueller et al. | 251/293 |
| 3,744,752 | 7/1973 | Massey | 251/288 X |
| 4,756,507 | 7/1988 | McAndrew | 251/292 |
| 5,014,528 | 4/1991 | Roberts | 251/288 X |
| 5,183,073 | 2/1993 | Roberts | 251/288 X |
| 5,188,335 | 2/1993 | Pettinaroli | 251/288 X |
| 5,240,030 | 8/1993 | Wang | 251/292 X |

OTHER PUBLICATIONS

Neles—Jamesbury Bulletin B–160–3 (Neles—Jamesbury, Inc., 1988).

Primary Examiner—John Rivell
Attorney, Agent, or Firm—Michael, Best & Friedrich

[57] ABSTRACT

A rotatable control device or valve including a body housing a control mechanism and a rotatably mounted control shaft connected to the control mechanism. Stops are spaced circumferentially relative to the control shaft. A stop arm is operably connected to the control shaft and engages the stops to limit rotational movement of the control mechanism between first and second positions. An elongated extension is drivingly connected to the stop arm, and an elongated operating handle is connected to the extension with the orientation of the longitudinal axis of the operating handle corresponding in a predetermined relationship to the position of the control member. A registration mechanism permits the extension to be drivingly connected to the stop arm only when the orientation of the longitudinal axis of the operating handle corresponds in the predetermined relationship to the position of the control means.

16 Claims, 2 Drawing Sheets

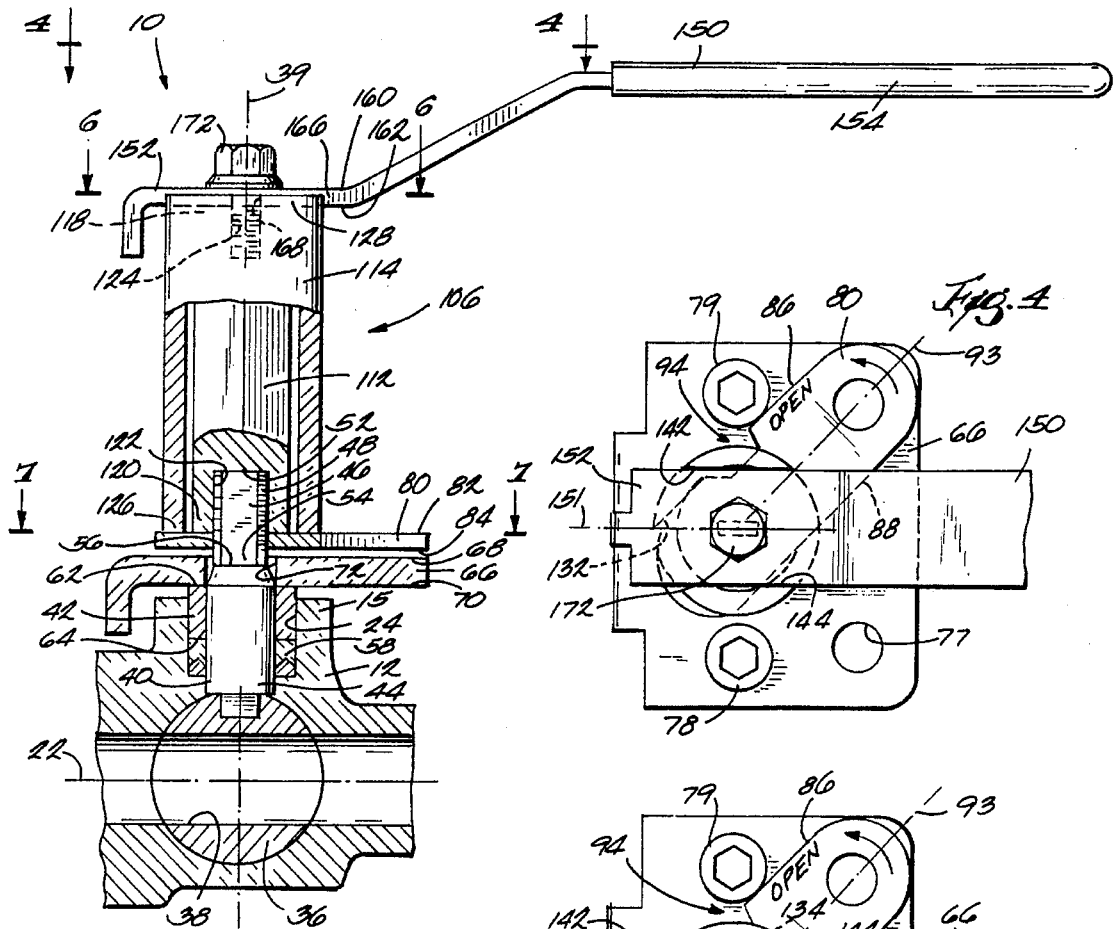

STEM EXTENSION FOR QUARTER-TURN VALVES

BACKGROUND OF THE INVENTION

1. Field of the Invention

The invention relates to extensions for rotatable control devices including a rotatable control shaft extending outwardly from a body housing a control means, wherein the extension is connected between the control shaft and an elongated operating handle for operating the control means. In one aspect, the invention relates to extensions for quarter-turn valves, such as ball valves, butterfly valves and plug valves.

2. Reference to Prior Art

Manually operated valves for controlling fluid flow through piping systems typically include a body having a flow passage extending therethrough, a valve member such as a rotatable ball disposed in the body, a control shaft or stem connected to the valve member and extending out of the body, an operating handle operably connected to the stem for moving the valve member between open and closed positions, and stops on the body for limiting rotation of the operating handle between the open and closed positions. In particular, quarter-turn valves having elongated operating handles are conventionally configured so that the longitudinal axis of the operating handle is parallel to the flow passage when the valve is open and perpendicular to the flow passage when the valve is closed. Therefore, the orientation of the handle provides a ready visual indication of whether the valve is open or closed.

An extension is connected between the operating handle and stem when it is necessary to space the operating handle from the valve body, such as when the valve is in a location which is difficult to reach or when the valve body is encased in insulation. An extension may be added either during assembly of the new valve at the factory, or may be sold separately in a retrofit kit for installation on the valve in the field. When an extension is used, it is possible that the operating handle can be installed relative to the valve stem and flow passage in an orientation different from the position in which it was originally installed at the factory or otherwise intended to be installed.

When an extension is added to a quarter-turn valve, it is possible that the extension will be installed on the stem and the operating handle installed on the extension so the operating handle is aligned opposite from the conventional orientation, i.e., the longitudinal axis of the operating handle extending perpendicularly to the flow passage when the valve is open and extending parallel to the flow passage when the valve is closed. When the operating handle of a quarter-turn valve is aligned opposite from the conventional orientation, the visual indication provided by the position of the handle relative to the flow passage is inaccurate. As a result, although personnel are generally instructed to manually verify whether valves are open or closed, personnel failing to manually verify the condition of the valve can erroneously believe that the valve is open when it is actually closed, or vice-versa. The same is true when an inspection is made during system operation. This kind of error can cause a variety of process problems, such as shutting off water to a fire sprinkler system, spilling fluid from the piping system, and unintendedly introducing fluid into portions of the piping system.

Quarter turn valves typically include packing around the valve stem to prevent leakage of fluid from the flow passage through space around the valve stem. Valves having "drawdown" packing around the valve stem typically include packing such as felt, an annular gland follower, a pull-down plate for forcing the gland follower down against the packing to compress the packing around the stem, and pull-down screws spaced radially outwardly from the stem and extending through holes in the pull-down plate into threaded cavities in the valve body for forcing or "pulling" the plate down against the gland follower. The pull down screws are diametrically spaced relative to the rotational axis of the stem, and the heads of these screws can act as stops for the operating handle.

U.S. Pat. No. 4,756,507 to McAndrew, discloses a ball or plug valve extension and lock mechanism. The valve extension includes a rod member to extend the valve stem. The rod member has a lower end bored and threaded to threadably engage the exposed end of the valve stem. Set screws extend horizontally into the bore to bear on the sides of the valve stem to align the rod with the valve stem. When the handle is turned, the valve stem is turned by the rod and set screws, and the set screws prevent the rod from loosening. The valve does-not include pull-down packing.

Two stem extensions are disclosed in Neles-Jamesbury Bulletin B-160-3 (Neles-Jamesbury, Inc., 1988). In one arrangement, the operating handle, stop arm and extension are a one-piece unit which is operably connected to the outer end of the valve stem. Stops on the valve body adjacent to the valve stem body are spaced ninety degrees from each other. In the second arrangement, the stop arm is welded to the inner end of the extension, the extension is threaded onto the outer end of the valve stem, and the operating handle is removably mounted on the outer end of the extension. In neither arrangement does the valve include pull-down packing.

SUMMARY OF THE INVENTION

The invention provides a rotatable control device or valve including control means, a rotatable control shaft or stem connected to the control means, an extension, an operating handle connected to the outer end of the extension, and the inner end of the extension being arranged so that the extension can be operably connected to the stem only when the orientation of the longitudinal axis of the operating handle corresponds in a predetermined relationship to the position of the control means.

In one aspect, the invention provides a quarter turn valve having pull-down packing and pull-down bolts circumferentially spaced relative to the stem rotational axis and serving as stop means, and the extension is arranged so that it can be operably connected to the stem only when the longitudinal axis of the operating handle extends parallel to the longitudinal axis of the flow passage when the valve is open and perpendicularly to the longitudinal axis of the flow passage when the valve is closed.

More particularly, the invention provides a rotatable control device including a body housing a control means. A control shaft is mounted in the body and connected to the control means. First and second stop means extend outwardly from the body and are spaced radially outwardly from and circumferentially spaced relative to the rotational axis of the control shaft at locations corresponding to first and second positions of the control means. A stop arm is operably connected to the external portion of the control shaft for common rotation therewith and is engageable with the first and second stop means to limit rotational movement of the control means between the first and second positions. An elongated extension has an inner end portion drivingly connected to the stop arm for common rotation therewith and an outer end portion operably connected to an elongated operating handle. The operating handle has a longitudinal axis, an inner end portion connected to the outer end portion of the extension, and a gripping portion. Handle connecting means operably connects the inner end portion of the operating handle to the outer end portion of the extension with the longitudinal axis of the operating handle extending generally perpendicularly to the rotational axis of the control shaft and with the orientation of the longitudinal axis of the operating handle corresponding in a predetermined relationship to the position of the control means. Registration means on the stop arm and the inner end portion of the extension permit, during assembly of the control device, the extension to be drivingly connected to the stop arm for common rotation therewith only when the orientation of the longitudinal axis of the operating handle corresponds in the predetermined relationship to the position of the control means.

In one embodiment, the extension comprises a rod member and a tubular sleeve. The rod member has an outer end portion and an inner end portion operably connected to the external portion of the control shaft for common rotation therewith. The tubular sleeve fits over the rod member and has an outer end and an inner end including diametrically opposed first and second notches. The stop arm and the first and second notches are dimensioned to permit the first and second notches to receive and engage the stop arm to afford common rotation of the stop arm and the sleeve only when the longitudinal axis of the operating handle corresponds in the predetermined relationship to the position of the control member. Preferably, the stop arm has opposed side edges and one of the side edges has therein a stop arm notch, and one of the first and second notches is dimensioned to receive the stop arm only between the stop arm notch and the other of the side edges to afford common rotation of the stop arm and sleeve. Also, preferably the operating handle and the first and second notches are dimensioned to prevent at least one of the first and second notches from receiving the operating handle and thereby preventing the sleeve from being operably connected to the operating handle when assembly of the outer end of the sleeve with the operating handle is attempted. Preferably, the inner end portion of the operating handle has opposed side edges, and the outer end of the sleeve has therein diametrically opposed third and fourth notches for receiving the inner end portion of the operating handle and engaging the opposed side edges thereof. Preferably, the handle connection means includes means such as a screw for fastening the inner end portion of the operating handle to the outer end of the rod member.

In one embodiment, the invention provides a valve including a body having a flow passage extending therethrough. A valve member is disposed in the flow passage and is movable between an open position permitting flow through the flow passage and a closed position preventing flow through the flow passage. The inner end portion of the operating handle is operably connected to the outer end portion of the extension by handle connecting means such that the longitudinal axis of the operating handle is parallel to the longitudinal axis of the flow passage when the valve member is in the open position and perpendicular to the longitudinal axis of the flow passage when the valve member is in the closed position. Registration means on the stop arm and the inner end portion of the extension permits, during assembly of the valve, the extension to be drivingly connected to the stop arm only when the orientation of the operating handle corresponds as described to the position of the valve member.

BRIEF DESCRIPTION OF THE DRAWINGS

FIG. 2 is a partial cross sectional view taken generally along line 2—2 in FIG. 1.

FIG. 4 is a top view taken generally along line 4—4 in FIG. 2, showing the valve in the open position.

FIG. 5 is a top view similar to FIG. 4, showing the valve in the closed position.

FIG. 6 is a partial sectional view taken generally along line 6—6 in FIG. 2, showing the valve in the open position with the operating handle removed.

FIG. 7 is a partial sectional view taken generally along line 7—7 in FIG. 2, showing the valve in the open position.

DETAILED DESCRIPTION OF A PREFERRED EMBODIMENT

Extensions embodying the invention can be adapted for a variety of control devices including a rotatable control shaft extending outwardly from a body housing a control means, and an elongated operating handle operably connected to the control shaft for rotational movement of the control means where the operating handle must be spaced some distance away from the body, such as rheostats, potentiometers, variable capacitors, control cable operators and the like. An extension embodying the invention is particularly adaptable for manually operated, quarter-turn valves, such as ball valves, butterfly valves and plug valves, and will be described in connection with a ball valve.

Figure 1:
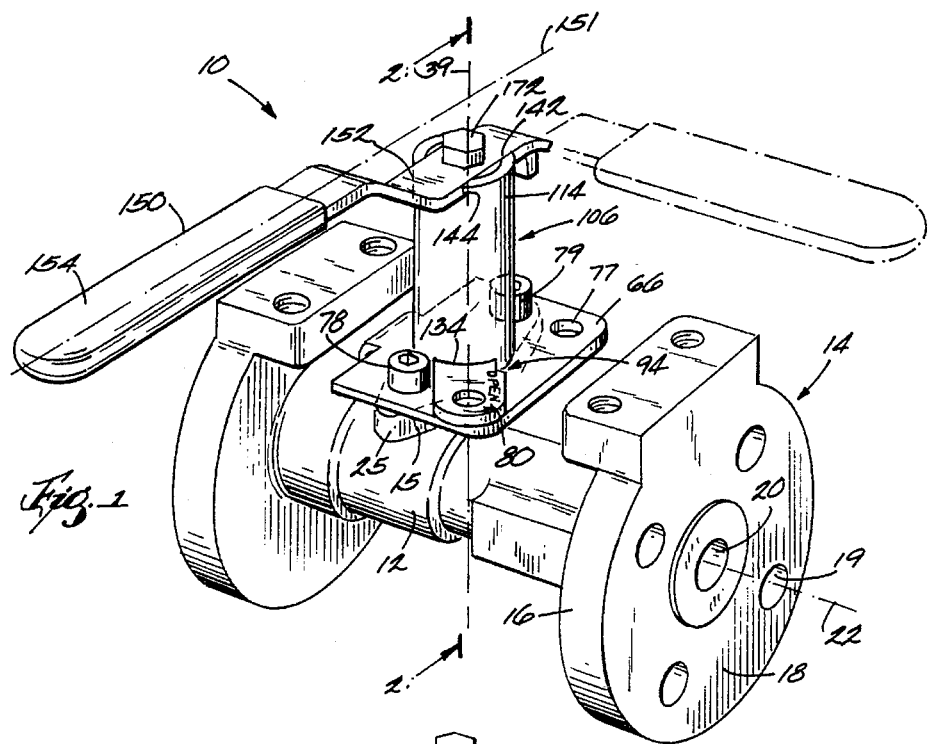
FIG. 1 is a perspective view of a quarter-turn ball valve embodying the invention.
Figure 3:
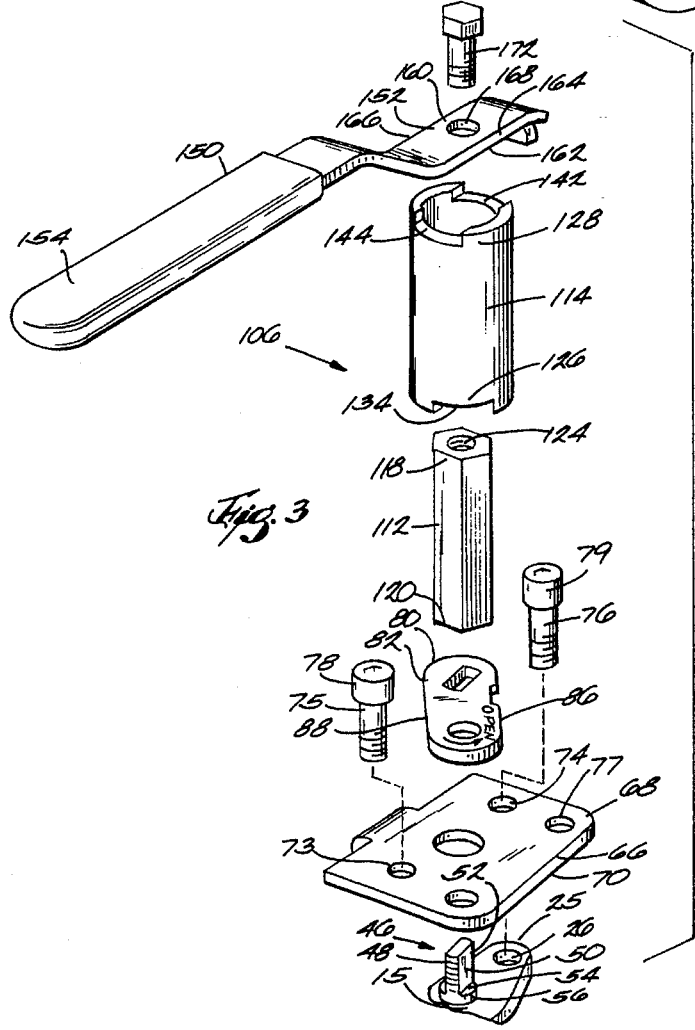
FIG. 3 is an exploded, perspective view of a portion of the valve shown in FIG. 1.
Figure 8:
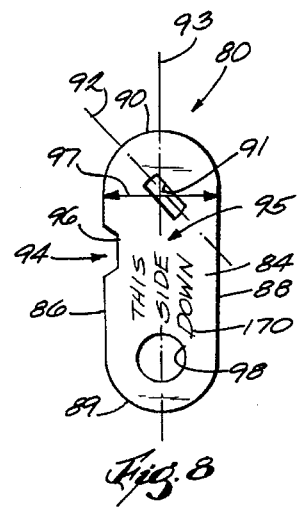
FIG. 8 is a bottom view of the stop arm.

Illustrated in FIGS. 1–3 is a quarter-turn ball valve 10 including a body 12 having opposed end portions 14 and an external boss 15. The end portions 14 are adapted for connecting the body 12 to adjacent pipes (not shown). Although other types of connections can be used, in the illustrated embodiment each end portion 14 includes a flanged portion 16 for abutting a similar flanged portion on an adjacent pipe. Each flanged portion 16 includes an outwardly facing abutment surface 18 including a plurality of circumferentially spaced apertures 19 through which bolts (not shown) extend for connecting the flanged portion 16 to the abutting flanged portion on the adjacent pipe. A flow passage 20 having a longitudinal axis 22 is defined in the body 12 and extends through the body 12 between the end portions 14 for permitting a fluid such as gas, liquid, or similar material to flow through the valve 10. When the flanged portions 16 are connected to respective adjacent pipes, the flow passage 20 communicates with the adjacent pipes for fluid to pass through the valve 10 and pipes.

The boss 15 (FIG. 2) includes a central opening 24 extending radially outwardly from the flow passage 20 and a pair of diametrically opposed, radially outwardly extending ears 25, each including a threaded aperture 26 (one shown in FIG. 3).

Disposed in the flow passage 20 is a valve member 36 consisting of a ball having a central opening 38. The ball 36 is rotatable about an axis 39 perpendicular to the flow passage axis 22, such that the opening 38 can be selectively aligned with the flow passage 20 to permit flow therethrough. The ball 36 is selectively movable 90° between an open position where the opening 36 is aligned with the flow passage 20, as shown in FIG. 2 for permitting flow through the flow passage 20, and a closed position preventing flow through the flow passage 20.

A control shaft or stem 40 is journaled in the boss opening 24 via a gland follower 42 for rotation about the axis 39. The stem 40 includes an internal portion 44 connected to the ball 36 and an external portion 46 extending outwardly from the body 12. The external portion 46 (FIGS. 2 and 3) is a stud including external threads 48 and a pair of opposed flats 50. Each of the flats 50 has an outer end portion 52 and an opposed inner end portion 54, and the flats 50 and threads 48 terminate at a shoulder 56.

Leakage past the stem 40 is prevented by packing 58 disposed in the boss opening 24 and surrounding the internal portion 44 of the stem 40. The gland follower 42 is an annular member having opposed upper and lower end portions 62, 64. The packing 58 is compressed between the stem 40 and the boss opening 24 by the lower end portion 64 of the gland follower 42 to prevent fluid from escaping out of the flow passage 20 through the stem aperture 24. The force for moving the gland follower 42 to compress the packing 58 is applied by a pull-down plate 66 having upper and lower surface 68, 70 and a central aperture 72 extending therethrough for receiving the external portion 46 of the stem 40. The pull-down plate 66 has a pair of mounting holes 73 and 74 which are diametrically opposed relative to and spaced radially outwardly from the central aperture 72. The mounting holes 73, 74 are alignable with the apertures 26 in the boss ears 25 when the pull-down plate 66 is in place. When threaded pull-down screws 75, 76 are inserted through mounting holes 73, 74 and threaded into the apertures 26, the heads 78, 79 of respective pull-down screws 75, 76 contact the upper surface 68 of the pull-down plate 66 and force or pull the lower surface 70 downwardly against the upper end portion 62 of the gland follower 42 and thereby cause the gland follower 42 to compress the packing 58 between the stem 40 and the boss opening 24. The heads 78, 79 of the pull-down screws 75, 76 also serve as stop means as described below. The pull down plate 66 also has a pair of lock holes 77 which are circumferentially spaced relative to the rotational axis 39 of the stem 48.

The valve 10 includes a stop arm 80 operably connected to the external portion 46 of the stem 40 for common rotation therewith. The stop arm 80 is an elongated, flat member including opposed upper and lower portions or surfaces 82, 84, opposed side edges 86, 88, an arcuate outer end portion 89 and an opposed arcuate inner end portion 90 including an elongate aperture 91 for receiving the external portion 46 of the stem 40. The stop arm aperture 91 is shaped like the external portion 46 of the stem 40, i.e., has flat sides, so that the stop arm 80 rotates with the stem 40. For reasons discussed below, the longitudinal axis 92 of the stop arm aperture 91 is at a 45° angle to the longitudinal axis 93 of the stop arm 80. The side edge 86 has a stop arm notch 94, and the width of the portion 95 of the stop arm 80 between the inner edge 96 of the notch 94 and the opposite side edge 88 is substantially less then the width 97 between the side edges 86 and 88. The outer end portion 89 has therein a lock aperture 98 extending between the upper and lower surfaces 82, 84.

The valve 10 includes an elongated extension 106 operably connected to the stop arm 80. In the illustrated embodiment the extension 106 includes a rod member 112 and a tubular sleeve 114. The rod member 112 has an inner end portion 120 including an internally threaded cavity 122, and an outer end portion 118 including an internally threaded cavity 124. The internally threaded cavity 122 receives the external portion 46 of the stem 40. When the rod member 112 is threaded onto the external portion 46 of the stem 40, the stop arm 80 is sandwiched between the inner end portion 120 and the stem shoulder 56.

The tubular sleeve 114 (FIGS. 1–3) has opposed inner and outer ends 126, 128 and fits around, is concentric with and is slightly longer than the rod member 112. The inner end 126 (Pigs. 1, 2 and 7) of the tubular sleeve 114 includes a pair of diametrically opposed first and second notches 132, 134 having a depth (FIGS. 1 and 3) approximately the same as the thickness of the stop arm 80. The width of the first notch 132 is approximately the same as and slightly greater than the width 97 of the stop arm 80 between the side edges 86 and 88. The width of the second notch 134 is approximately the same as and slightly greater than the width of the portion 95 of the stop arm 80 between the inner edge 96 of the stop arm notch 94 and the side edge 88.

The sleeve 114 can fit down over the stop arm 80 and drivingly engage the stop arm 80 only when the sleeve 114 is orientated so that the second notch 134 can receive the portion 95 of the stop arm 80 between the inner edge 96 of the stop arm notch 94 and the side edge 88 and the first notch 132 can receive the full width 97 of the stop arm 80. When the sleeve 114 is rotated thereafter, the sides of the sleeve second notch 134 engage the side edge 88 and the notch inner edge 96, and the sides of the sleeve first notch 132 engage the side edges 86 and 88, and the stem 40 is rotated via the stop arm 80. If the sleeve 114 is orientated with the first notch 132 located at the stop arm notch 94, the sleeve 114 will not fit down over the stop arm 80 because the second notch 134 is narrower than the width 97 of the stop arm 80.

The outer end 128 (FIGS. 2–6) of the tubular sleeve 114 includes a pair of diametrically opposed third and fourth notches 142, 144 of the same width and depth. As best shown in FIGS. 4 and 6, the third and fourth notches 142, 144 are oriented at about 45° angles from the first and second notches 132, 134.

An elongated operating handle 150 (FIGS. 1–5) is operably connected to the outer end portion of the elongated extension 106 for common rotation therewith. The operating handle 150 is a generally flat member having a longitudinal axis 151, an inner end portion 152 and a gripping portion 154. The gripping portion 154 is covered with a soft, resilient material, such as synthetic thermosetting or thermoplastic material, for enabling an operator to manually grip and turn the operating handle 150. The inner end portion 152 of the operating handle 150 includes opposed upper and lower portions or surfaces 160, 162 and opposed side edges 164, 166. The width of the operating handle 150 between the side edges 164 and 166 is the same as the width 97 of the stop arm 80 between the side edges 86 and 88. The width of each of the third and fourth notches 142, 144 in the tubular sleeve 114 is approximately the same as and slightly greater than the width of the inner end portion 152 of the operating handle 150 between the side edges 164, 166, and the depth of these notches 142, 144 is approximately the same as the thickness of the inner end portion 152 of the operating handle 150 for receiving the operating handle 150 in the third and fourth notches 142, 144. The inner end portion 152 of the operating handle 150 has a circular aperture 168 extending between the upper and lower surfaces 160, 162.

The valve 10 includes handle connecting means 172 for operably connecting the inner end portion 152 of the operating handle 150 to the outer end portion of the extension 106. In the illustrated embodiment, the handle connecting means 172 is a screw. The screw 172 extends through the aperture 168 in the operating handle 150 and is received in the threaded cavity 124 in the outer end portion 118 of the rod member 112, so that the head of the screw 172 retains the operating handle in the third and fourth notches 142, 144.

When installing the extension 106, the stop arm 80 is installed on the stem 40 with the lower surface 84 facing down and the stem 40 received in the aperture 98 in the inner end portion 90 of the stop arm 80. The rod member 112 is connected to the external portion 46 of the stem 40 by threading the external threads 48 on the stem 40 into the internally threaded cavity 122 in the inner end portion 120 of the rod member 112, so that the stop arm 80 is sandwiched between the shoulders 56 of the stem 40 and the inner end portion 120 of the rod member 112. The tubular sleeve 114 is slid over the rod member 112 so that the stop arm 80 is drivingly received in the first and second notches 132, 134 in the inner end 126 of the tubular sleeve 114.

Because the second notch 134 is only wide enough to receive the portion 95 of the stop arm 80 between the inner edge 96 of the stop arm notch 94 and the side edge 88, the tubular sleeve 114 can only be drivingly connected to the stop arm 80 in a single orientation relative to the stop arm 80. After the tubular sleeve 114 is positioned on the stop arm 80, the operating handle 150 is fitted onto the outer end 128 of the tubular sleeve 114 with the inner end portion 152 of the operating handle 150 received in the third and fourth notches 142, 144. Then, the screw 172 is threaded into the threaded cavity 124 in the outer end portion 118 of the rod member 112, such that the operating handle 150 is operably retained in the third and fourth notches 142, 144. When the operating handle 150 is received in the third and fourth notches 142, 144, the longitudinal axis 151 of the operating handle 150 extends at a 45° angle to the longitudinal axis 93 of the stop arm 80.

To fully open the valve 10, the operating handle 150 is rotated 90° from the closed position shown in FIG. 5 until the side edge 86 of the stop arm 80 abuts the head 79 of the second pull-down screw 76 as shown in FIG. 4. When the stop arm 80 abuts the head 79 of the pull-down screw 76, the longitudinal axis 151 of the operating handle 150 extends parallel to the longitudinal axis 22 of the flow passage 20. To close the valve, the operating handle 150 is rotated 90° in the opposite direction until the side edge 88 of the stop arm 80 abuts the head 78 of the pull-down screw 75. When the stop arm 80 is in that position, the longitudinal axis 151 of the operating handle 150 extends perpendicular to the longitudinal axis 22 of the flow passage 20. A padlock (not shown) can be inserted through the lock aperture 98 in the stop arm 80 and a respective one of the lock apertures 77 in the pull-down plate 66 to secure the valve member 36 in either of the open and closed positions.

The pull-down plate 66 forcing the gland follower 42 and packing 58 down around the stem 40 in the boss opening 24 provides a tight seal preventing leakage of fluid, particularly gases, from the flow passage 20 around the valve member 36. In part, this is because the gland follower 42 is not threaded and therefore does not twist or rotate relative to the stem 40 and packing 58. When the operating handle 150 is connected to the extension 106 and is thereby spaced from the pull down plate 66, the stop arm 80 abuts the heads 78,79 of pull down screws 75,76 and thereby limits movement of the valve member 36 between the open and closed positions. The notch 94 in the stop arm 80 and the relative sizes of the first and second notches 132, 134 on the tubular sleeve 114 prevent the sleeve 114 from being drivingly connected to the stop arm 80 when the stop arm 80 is installed in the wrong orientation relative to the valve stem 40 and the first and second pull-down screws 75 and 76.

The stop arm 80 preferably includes visual indicia 170 on the lower surface 84, such as "THIS SIDE DOWN," for indicating to one installing the extension 106 that the lower surface 84 must face inwardly relative to the body 12 in order to permit proper installation of the extension 106 and operating handle 150. The notch 94 in the stop arm 80 and the relative sizes of the first and second notches 132, 134 in the sleeve 114 also prevent the sleeve 114 from being drivingly connected to the stop arm 80 when the tubular sleeve 114 is turned in the wrong orientation relative to the stop arm 80, the stem 40 and the first and second pull-down screws 75 and 76. The stop arm notch 94 and the relative widths of the operating handle 150 and the first and second notches 132, 134 and the third fourth notches 142,144 in the sleeve 114 also prevent the sleeve 114 from being drivingly connected to the stop arm 80 when the inner and outer ends 126, 128 of the sleeve 114 are in the wrong orientation relative to the stop arm 80 and the operating handle 150.

I claim:

1. A rotatable control device including
   a body housing a control means;
   a control shaft mounted in said body for rotation about an axis and having an internal portion connected to said control means and an external portion extending outwardly from said body;
   first and second stop means extending outwardly from said body and spaced radially outwardly from and circumferentially spaced relative to the rotational axis of said control shaft at locations corresponding to first and second positions of said control means;
   a stop arm operably connected to the external portion of said control shaft for common rotation therewith and engageable with said first and second stop means to limit rotational movement of said control means between the first and second positions;
   an elongated extension having an inner end portion and an outer end portion;
   an elongated operating handle having a longitudinal axis, an inner end portion and a gripping portion;
   handle connecting means for drivingly connecting the inner end portion of said operating handle to the outer end portion of said extension with the longitudinal axis of said operating handle extending generally perpendicularly to the rotational axis of said control shaft and with the orientation of the longitudinal axis of said operating handle corresponding in a predetermined relationship to the position of said control member; and
   registration means on said stop arm and the inner end portion of said extension for permitting, during assembly of said control device, said extension to be drivingly connected to said stop arm for common rotation therewith only when the orientation of the longitudinal axis of said operating handle corresponds to the predetermined relationship to the position of said control means.

2. A rotatable control device according to claim 1 wherein said extension comprises
   a rod member having an outer end portion and an inner end portion operably connected to the external portion of said control shaft for common rotation therewith;
   a tubular sleeve fitting over said rod member and having an outer end and an inner end including diametrically opposed first and second notches; and
   said stop arm and said first and second notches being dimensioned to permit said first and second notches to receive and engage said stop arm to afford common rotation of said stop arm and said sleeve only when the longitudinal axis of said operating handle corresponds to the predetermined relationship to the position of said control member.

3. A rotatable control device according to claim 2 wherein said stop arm has opposed side edges and one of said side edges has a stop arm notch; and one of said first and second notches is dimensioned to receive the portion of said stop arm between said stop arm notch and the other of said side edges and the other of said first and second notches is dimensioned to receive a wider portion of said stop arm to afford common rotation of said stop arm and said sleeve only when the longitudinal axis of said operating handle corresponds in the predetermined relationship to the position of said control member.

4. A rotatable control device according to claim 3 wherein said operating handle and said first and second notches are dimensioned to prevent at least one of said first and second notches from receiving said operating handle and thereby preventing said sleeve from being drivingly connected to said stop arm when assembly of said outer end of said sleeve with said stop arm is attempted.

5. A rotatable control device according to claim 3 wherein the inner end portion of said operating handle has opposed side edges; and said handle connection means includes diametrically opposed third and fourth notches in the outer end of said sleeve receiving said inner end portion of said operating handle and engageable with the opposed side edges thereof, and means for fastening the inner end portion of said operating handle to the outer end of said rod member.

6. A rotatable control device according to claim 5 wherein one of said first and second notches is dimensioned to prevent receipt of said inner end portion of said operating handle to said outer end portion of said extension when said inner end portion of said handle is not received in said at least one of said first and second notches.

7. A rotatable control device according to claim 3 wherein said handle connecting means is dimensioned to prevent operably connecting said inner end portion of said operating handle to said outer end portion of said extension when said stop arm is not received in said one of said first and second notches.

8. A rotatable control device according to claim 3 wherein said stop arm has opposed top and bottom surfaces and includes indicia on one of said surfaces for indicating which of said surfaces should be facing outwardly relative to said body for proper installation.

9. A valve including a body having flow passage extending therethrough, and having a longitudinal axis;

a valve member disposed in said flow passage and movable between an open position to permit flow through said flow passage and a closed position to prevent flow through said flow passage;

a stem mounted in said body for rotation about an axis and having an internal portion connected to said valve member and an external portion extending outwardly from said body;

first and second stop means extending outwardly from said body and spaced radially outwardly from and circumferentially spaced relative to the rotational axis of said stem at locations corresponding to the open and closed positions of said valve member;

a stop arm operably connected to the external portion of said stem for common rotation therewith and engageable with said first and second stop means to limit rotational movement of said valve member between the open and closed positions;

an elongated extension having an inner end portion and an outer end portion;

an elongated operating handle having a longitudinal axis, an inner end portion and gripping portion;

handle connecting means for operably connecting the inner end portion of said operating handle to the outer end portion of said extension with the longitudinal axis of said operating handle extending generally perpendicularly to the rotational axis of said stem and with the longitudinal axis of said operating handle being parallel to the longitudinal axis of said flow passage when said valve member is in the open position and perpendicular to the longitudinal axis of said flow passage when said valve member is in the closed position; and registration means on said stop arm and the inner end portion of said extension for permitting, during assembly of said valve, said extension to be drivingly connected to said stop arm for common rotation therewith only when the longitudinal axis of said operating handle corresponds to the position of said valve member.

10. A valve according to claim 9 wherein said extension comprises a rod member having an outer end portion and an inner end portion operably connected to the external portion of said stem for common rotation therewith;

a tubular sleeve fitting over said rod member and having an outer end and an inner end including diametrically opposed first and second notches; and said stop arm and said first and second notches being dimensioned to permit said first and second notches to receive and engage said stop arm to afford common rotation of said stop arm and said sleeve only when the longitudinal axis of said operating handle corresponds to the position of said control member.

11. A valve according to claim 10 wherein said stop arm has opposed side edges and one of said side edges has therein a stop arm notch; and one of said first and second notches is dimensioned to receive the portion of said stop arm between said stop arm notch and the other of said side edges and the other of said first and second notches is dimensioned to receive a wider portion of said stop arm to afford driving connection of said stop arm by said sleeve only when the longitudinal axis of said operating handle corresponds to the position of said control member.

12. A valve according to claim 11 wherein said operating handle and said first and second notches are dimensioned to prevent at least one of said first and second notches from receiving said operating handle and thereby preventing said sleeve from being drivingly connected to said stop arm when assembly of said outer end of said sleeve with said stop arm is attempted.

13. A valve according to claim 11 wherein the inner end portion of said operating handle has opposed side edges; and said handle connection means includes diametrically opposed third and fourth notches in the outer end of said sleeve receiving said inner end portion of said operating handle and engageable with the opposed side edges thereof, and means for fastening the inner end portion of said operating handle to the outer end of said rod member.

14. A valve according to claim 13 wherein one of said first and second notches is dimensioned to prevent receipt of said inner end portion of said operating handle to said outer end portion of said extension when said inner end portion of said handle is not received in said at least one of said first and second notches.

15. A valve according to claim 11 wherein said handle connecting means is dimensioned to prevent operably connecting said inner end portion of said operating handle to said outer end portion of said extension when said stop arm is not received in said one of said first and second notches.

16. A valve according to claim 11 wherein said stop arm has opposed top and bottom portions and includes indicia on one of said surfaces for indicating which of said surfaces should be facing outwardly relative to said body for proper installation.

* * * * *